United States Patent
Duffy

[11] 3,870,414
[45] Mar. 11, 1975

[54] METHOD FOR SENSING SURFACE DISPLACEMENT ORTHOGONAL TO THE DIRECTION OF OBSERVATION

[75] Inventor: Donald E. Duffy, Edmond, Okla.

[73] Assignee: General Electric Company, Syracuse, N.Y.

[22] Filed: May 25, 1973

[21] Appl. No.: 363,974

[52] U.S. Cl. ........... 356/109, 356/111, 350/162 SF, 250/550
[51] Int. Cl. ............................................. G01b 9/02
[58] Field of Search ........... 356/106, 107, 108, 109, 356/110, 111, 112, 113; 350/162 SF; 250/550

[56] References Cited
OTHER PUBLICATIONS

Archbold et al., A Laser Speckle ... "Vibration, Optical Instruments and Techniques," Dickson, Ed. Oriel Press, 9/70.

Leendertz, Measurement of Surface Displacement by Interference of Speckle Pattern, "Optical Instruments and Techniques," Oriel Press, 9/70.

*Primary Examiner*—Ronald L. Wibert
*Assistant Examiner*—Conrad Clark
*Attorney, Agent, or Firm*—Richard V. Lang; Carl W. Baker; Frank L. Neuhauser

[57] ABSTRACT

A novel method of sensing differential surface displacement orthogonal to the direction of observation is described. The object is imaged at two conditions of differential displacement under illumination providing appreciable surface detail. The images are superimposed to form a composite transparency, which when viewed under coherent illumination and spatially filtered, provides interference fringes indicative of surface displacement. The invention is applicable to measuring surface distortion of an object under static or vibratory conditions.

9 Claims, 8 Drawing Figures

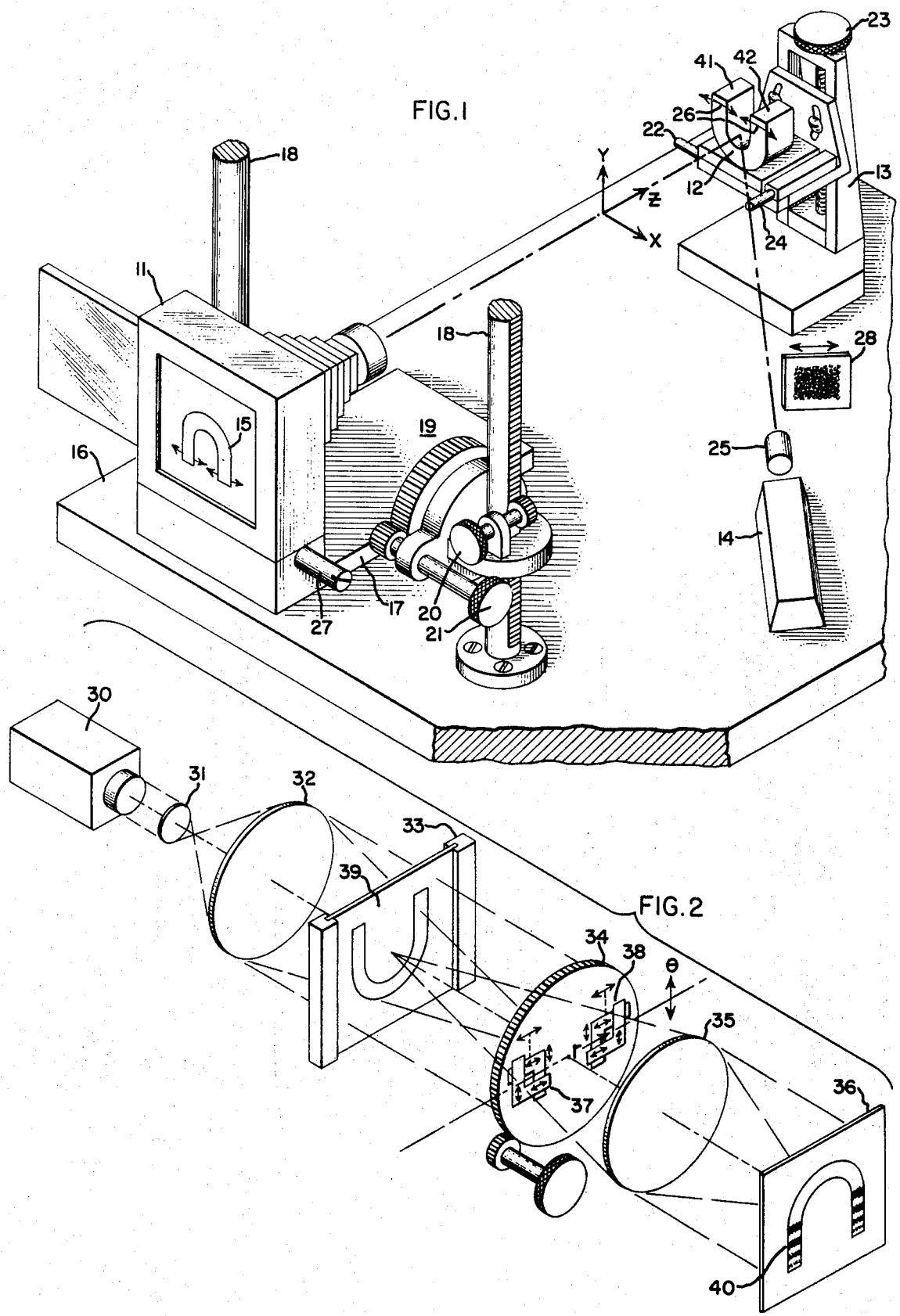

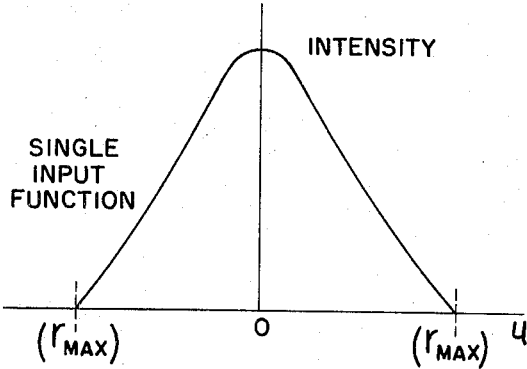
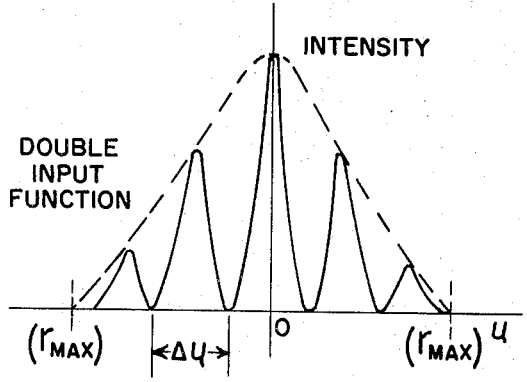
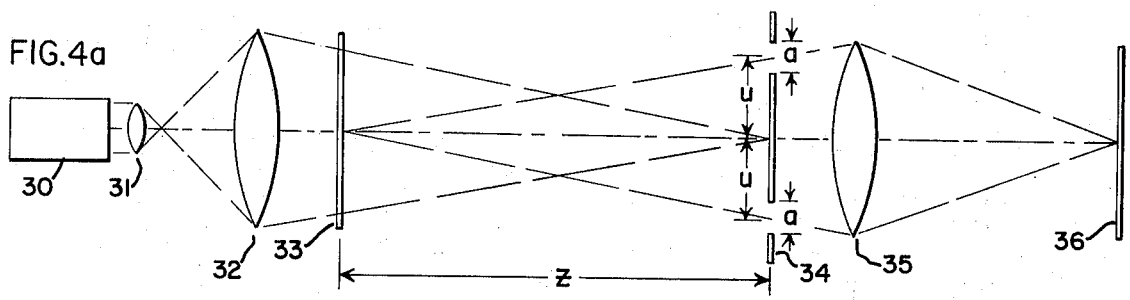
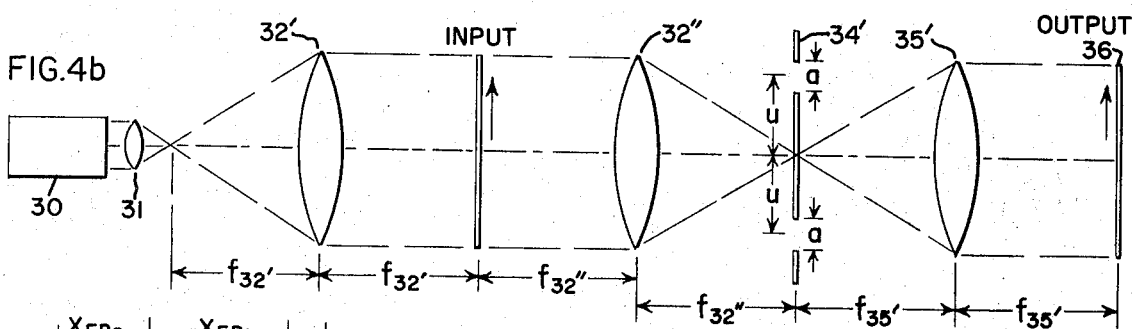
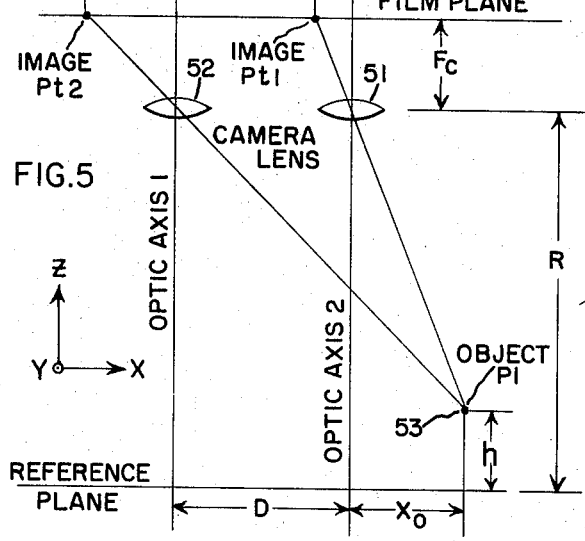
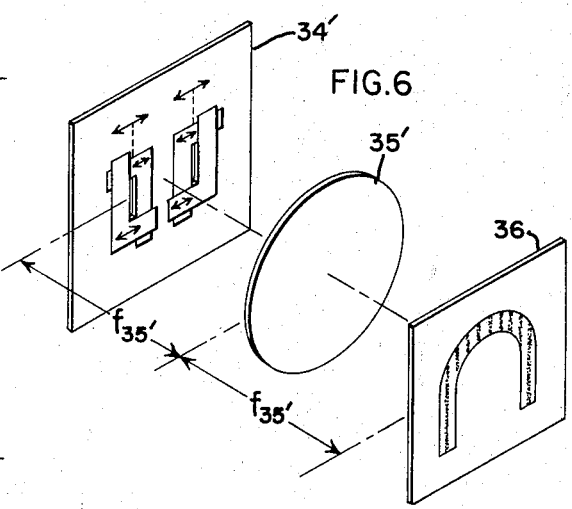

METHOD FOR SENSING SURFACE DISPLACEMENT ORTHOGONAL TO THE DIRECTION OF OBSERVATION

The present application is related to a copending application (Ser. No. 363,975) of Donald E. Duffy and Joseph L. Chovan entitled "Method of Surface," and filed concurrently herewith.

BACKGROUND OF THE INVENTION

1. Field of the Invention

The present invention relates to the art of optically sensing fine displacements and surface distortions. Input surface information derived from a pair of photographic images is coherently processed by means including spatial filters.

2. Description of the Prior Art

The present application represents an extension of the teaching in U.S. Pat. No. 3,767,308, filed on Jan. 12, 1972 by Donald E. Duffy and entitled "Method and Apparatus for Sensing Surface Displacement Orthogonal to the Line of Sight". In that application an object is illuminated with a single laser source and imaged by a lens having two laterally displaced apertures in front of the lens assembly. Two successive images are obtained and then superimposed. The superposition of a prior photograph upon a live or aerial image in the ground glass screen of the camera creates a pattern of interference fringes over the image indicative of lateral surface displacements. These fringes may be enhanced in a separate viewer using a laser source with a zero order stop into which a transparency having the two superimposed images is introduced.

The foregoing configuration, while permitting direct aerial viewing of a vibrating or distorted object, has the basic objection that the full lens apertures of the camera can not be utilized in obtaining the original photographic images. In addition, it is frequently desirable to be able to use photographs taken from unmodified photographic equipment for surface displacement analysis. The present application has as an object to overcome these two objections.

SUMMARY OF THE INVENTION

Accordingly, it is an object of the present invention to provide an improved method of sensing differential surface of an object displacement of an object orthogonal to the direction of observation.

It is another object of the invention to provide an improved method of sensing surface distortion of an object orthogonal to the direction of observation.

It is a further object of the present invention to provide an improved method of sensing surface distortion of an object orthogonal to the direction of observation by the formation of visible equal displacement contours superimposed upon the image of the object.

It is an additional object of the present invention to provide an improved method of sensing surface displacement of an object orthogonal to the direction of observation by obtaining a double image of said surface at different displacements and viewing said double image under coherent illumination with a spatial filter.

It is an additional object of the present invention to provide an improved method of sensing surface distortion of an object orthogonal to the direction of observation by obtaining a double image of said object at different displacements and viewing said double image under coherent illumination with a spatial filter.

These and other objects of the invention are achieved in a novel method of sensing differential surface displacement of surface elements of an object orthogonal to the direction of observation. The method comprises the steps of imaging said observed object under conditions of illumination providing appreciable surface detail, recording two correlatable images of said object between which surface elements of said object are displaced relative to the observer in a direction orthogonal to the direction of observation. Simultaneously superimposing elements of said images without relative rotation upon a transparency, illuminating said transparency by a narrow spectral band light source, and imaging said transparency through a narrow band spatial filter positioned to form an interference pattern. The spacing and orientation of the interference pattern indicates the magnitude and direction of differential orthogonal displacement of said surface elements. The method is applicable to sensing surface distortion.

In accordance with additional aspects of the invention, image superposition is done using separate images recorded on a single transparency with stationary or undistorted surface elements coincident or in registry. The recorded transparency is illuminated with coherent light, typically a point source. The spatial filter is diposed in the Fourier transform plane and has a narrow slot for restricting transmission to the region which is less than a cycle of the cosine factor in the Fourier transform plane of the double input function. The spatial filter is normally provided with a pair of such slots and a mounting which permits rotation in relation to the transparency. A preferred method of obtaining surface detail in the initial images is to use speckling laser illumination of the object.

BRIEF DESCRIPTION OF THE DRAWING

The novel and distinctive features of the invention are set forth in the claims appended to the present application. The invention itself, however, together with further objects and advantages thereof may be best understood by reference to the following description and accompanying drawings in which:

FIG. 1 is an illustration in perspective of apparatus suitable for making a photographic recording of the surface displacement of an object in a direction perpendicular to the line of sight or for making a photographic recording of the depth of an object measured along the line of sight, as the camera viewpoint is shifted;

FIG. 2 is an illustration in perspective of an apparatus suitable for viewing the photographic recording produced by the apparatus of FIG. 1 and producing motion contour or depth contour lines in an output plane;

FIG. 3a is a graph of the intensity distribution in the Fourier transform plane as a function of the distance from the axis of an image having suitable detail to provide vibration or depth contouring; and FIG. 3b is a graph of the intensity distribution function when a double input function is provided;

FIG. 4a is an optical schematic of the viewer apparatus shown in FIG. 2 and applicable to motion or depth contouring; and FIG. 4b is an optical schematic of a viewer having a more accurate optical system, applicable to either motion or depth contouring;

FIG. 5 is an optical diagram useful in calculating the parallax and difference in parallax to a point on an object when the camera viewpoint is shifted; and FIG. 6 is a drawing in perspective of a portion of a viewer adapted primarily for depth contouring.

DESCRIPTION OF THE PREFERRED EMBODIMENT

Referring now to FIG. 1, there is shown a disposition of apparatus suitable for making a photographic recording of the surface displacement of a distorted object. As will be described, the recording is of distortion in a direction orthogonal to the direction of observation. In FIG. 1, there is shown a plate camera 11 equipped for direct viewing and for making a photographic recording of the displacement. The distorted object 12 is shown supported on a stand 13 and a laser illuminator is shown at 14. A visual image of the object 12 under the illumination of the laser is formed on the viewer of the camera as generally shown at 15.

The foregoing equipment is supported upon a large rigid table 16. The camera 11 is supported upon an elevating and tilting base plate 17. As seen in the drawing, an elevating mechanism, including a pair of elevating columns 18 mounted upon the table 16, is provided for raising and lowering the camera and base plate subassembly. The pivotal support at 19 provides for tilting the axis of the camera subassembly. Elevation and tilting are achieved by a pair of hand controls 20 and 21, respectively. The tilting range is preferably adequate to permit the camera to be pointed down at an object directly underneath. In addition, the camera is provided with translation screws 27 for horizontally displacing the camera with respect to its stand 17. This motion is also at right angles to the camera axis. The construction of the base plate 17 and the columns 18 should be substantial so as to achieve rigidity suitable for optical bench applications and the positional adjustments should be self-maintaining. For flexibility, the columns 18 should permit the camera to be elevated to a distance substantially equal to the lateral viewing distance across the table top.

The axis of the camera defines the direction of observation — Z. With the camera in the position shown in FIG. 1, the Z direction measured along the camera axis is horizontal, the vertical direction orthogonal to the Z direction is the Y direction and the horizontal direction orthogonal to Y and Z is the X direction. The camera translation screws 27 displace the camera parallel to the X-axis. The illustrated disposition of the camera and the object 12 is suitable for recording X or Y components of surface distortion of the object, i.e., and in general those occurring in a vertical plane parallel to the X Y plane and perpendicular to the Z-axis.

The object 12, whose distortion is being studied, is supported with the area of interest arranged in line with the camera axis. The stand 13 should be of high rigidity and, for convenience, should normally have a fine adjustment capability. Translation screws illustrated at 22, 23 and 24 are for translation in the X, Y and Z directions, respectively. Rotation about a vertical axis is not illustrated, but may be provided. The translation and rotation mechanisms of the stand should be of rigid design conventional for optical bench applications.

The laser illuminator 14 is arranged to illuminate the object. The illuminator is supported upon the table 16 and a low power microscope objective 25 is provided for expanding the laser illumination to cover the object. Longer or shorter focal length lenses may be selected depending on the desired cone of illumination.

Prior to undertaking a description of the viewing apparatus illustrated in FIG. 2, a short explanation of the recording process will be undertaken. The object 12 and the camera 11 are supported in position for imaging the object on the ground glass viewer of the camera and the laser together with its ancillary lens 25 are adjusted for optimum illumination of the object in the camera viewer. It is assumed that the test object 12 is a tuning fork whose tines are set in vibration in the manner suggested by the arrows 26. The front surfaces of the tines of the tuning fork are oriented in a plane generally perpendicular to the Z axis and the handle of the tuning fork, which is not shown, is vertical. Thus, the principal component of displacement of the tines is in a plane parallel to the X Y plane and in the X direction. These orientations of the object with respect to the camera should be approximate but are not critical.

The photographic recording of the surface distortion may be made by one of several methods. In accordance with one method, a photographic plate is introduced into the field of the camera lens and the object is photographed first in a static, undistorted position. The object is then set in motion, and a second exposure is taken, preferably timed at the moment of extreme distortion. If such synchronization is inconvenient, then a longer single exposure may be taken of the object as it vibrates through several cycles of vibration. Since the dwell time of the object is greatest at the two extremes of motion, the effect of the time exposure is to emphasize the image at the two extremes of motion, and thus approaches the effect of separate exposures at these two moments.

A third method is available, if the camera shutter is capable of being synchronized with the vibration, or the light source strobed. One may specifically cause one exposure to occur at the maximum inward flexure and the other exposure to occur at the maximum outward flexure of the tines. In each case mentioned above, the photograph records the tine distortion at two mutually displaced positions.

Under the foregoing conditions, it is assumed that the successive images of the object, and in particular the stationary elements of the object, remain in accurate registry. If registry cannot be maintained between successive exposures, as for instance, from lesser commumunicated commuinicated to the supporting structures, then one may expose separate films. The two exposures are then photographically superimposed on a third film, while carefully registering the "stationary" elements of the vibrating object to minimize the effect of motion in the support.

The superimposed images derived by one of the foregoing methods may now be examined in the viewer of FIG. 2. The viewer is shown in perspective with some inaccuracy in the spacings of the individual optical elements along the axis to facilitate clearer illustration. FIG. 4a illustrates the principle of spacing the dimensions more accurately. (In general the elements 32 and 33 are closer together than shown, as are also the elements 34, 35.)

The viewer comprises a laser illumination system including the elements 30, 31, 32, a film support 33, a spatial filter 34, a lens 35 and an output viewing screen 36. All optical elements are of high optical quality and are rigidly supported along the optical axis of the viewer.

The illumination system uses a laser 30, a short focal length lens 31, and a large lens 32. The beam from the laser 30 is passed through the short focal length lens 31 which expands the beam to fill the large lens 32. The large lens 32 is used in part as a condenser lens to illuminate the photographic recording and in part as an input lens to provide a Fourier transformation of the image contained in the photographic recording in the film support 33. The film support 33, which supports the photographic recording 39, is placed in close proximity to the large lens 32. To properly perform its condensing function, lens 32 should be large enough to permit full illumination of the recorded image of the object. Both the optical elements 31 and 32 are of high quality suitable for precise image formation.

The next element in the viewer is the spatial filter 34. The spatial filter 34 is disposed in the plane where the optical system 31, 32 brings the image of the source to a focus. The spatial filter is provided with a pair of adjustable slots 37, 38, symmetrically displaced a variable distance $r$ from the axis of the viewer and rotatable about the viewer axis to an angle "$\theta$" with the horizontal. (Subsequently, the coordinates $u$ and $v$ will be assigned to the slots of the spatial filter.)

The central opaque region of the spatial filter acts as a stop for the focused image of the laser source 30. At the same time, the central region prevents passage of the lower spatial frequency terms of the Fourier transform of the illuminated image 39. The slots 37, 38 then make a symmetrical spatial selection of a band of higher frequency terms with the perimeter of the filter, precluding passage of terms of still higher spatial frequencies. The output lens 35 is positioned to form a spatially filtered image of the input plane upon the output viewing screen 36.

Assuming that the double exposed image of the vibrating object is erect as illustrated at 39 in FIG. 2 and that the spatial filter is oriented so that the slots 37, 38 are also in a horizontal plane ($\theta = 0$) and are suitably spaced for sensitivity in the range of the horizontal excursions being observed, then an image 40 will be formed in the output viewing screen 36 which contains a succession of interference bands whose lines are horizontal (as viewed in FIG. 2) and whose spatial separation is smallest where the amount of vibration is greatest. Thus, in the non-moving portions of the object, the region will be generally clear of interference bands (being either all dark or all white), whereas toward the tips of the tines, where motion is greatest, the bands will be closely spaced, alternating between light and dark as seen at 40.

The spacing of the interference bands is a linear function of the excursion and the slit spacing, wave length of light employed, and several other factors. As will be explained hereafter, the slots are spatial bandpass filters, whose narrowness measured along a line connecting their centers determines the bandwidth of the filter, and whose separation ($2r$) determines the central spatial frequency of the pass band. Assuming other elements of the optical system to remain unchanged, moving the slots together reduces the center of the pass band and is useful for coarser surface displacement measurements. Conversely, moving the slots apart increases the center frequency of the pass band and is useful for finer surface displacement measurements.

The creation of the interference bands and their use to determine the displacement of a surface in a direction normal to the line of sight will now be explained.

If a diffuse surface is illuminated with laser light and photographed, the image will contain fine speckles due to random interference of the coherent light scattered from the surface. The spatial frequency content of the image is essentially continuous with the finest spatial frequency being determined by the limiting aperture in the camera used to record the image. FIG. 3a shows a graph of the intensity along a diameter in the plane of the Fourier transformation for a transparencey having only a single speckle pattern image. A very similar pattern but with normally lesser high frequency boundaries, will be produced by a picture having appreciable surface detail. The $u$ coordinate of FIG. 3a is measured parallel to a line drawing between the centers of the slots 37, 38 and forming the axis of the spatial filter. The coordinate $v$ is measured orthogonal to the U axis. Both $u$ and $v$ axes pass through the axis of the viewer.

The radial distance $r_{max}$ in the transformation plane, where the intensity of the diffraction pattern approaches zero is given by $$r_{max} = \lambda F / S_m \quad (1)$$

where $\lambda$ is the optical wavelength employed, $F$ is the focal length of the processing lens 32 under the condition that the input to the processing lens is collimated, and $S_m$ is the inverse of the maximum spatial frequency present in the spectrum of the input transparency. It is further assumed that the lens 32 does not restrict the upper spatial frequency terms.

Since the FIG. 2 configuration does not use a collimated input to the processing lens 32, the relationship (1) does not precisely hold.

The relationship in the FIG. 2 configuration is approximated by the following expression:

$$r_{max} \approx \lambda z / S_m \quad (1')$$

where $z$ is the distance from the input plane 33 to the plane of the spatial filter 34. The relationship is an acceptable approximation when the lens 32 and spatial filter are close together so that $z$ approaches $F$.

The inverse of the spatial frequency $S_m$ in the transparency is determined by the following relationship:

$$S_m = \lambda F_c / D_c \quad (2)$$

where $F_c$ is the camera focal length and $D$ is the physical aperture. The ratio of $F_c/D_c$ is the $F$ number or relative aperture.

Now let one suppose that a double exposure photograph of the object is taken in which the object is given a horizontal (X direction) displacement between exposures. If the object is shifted a distance $d_o$, this causes the image recorded on the film in the second exposure to shift a distance $d$:

$$d = m \, d_o \quad (3)$$

where $m$ is the magnification of the picture on the film in relation to the object.

After development, the doubly exposed transparency is placed in the slide holding the optical processor, normally with the same orientation with respect to the horizontal and vertical axes as it had when it was recorded. Now if the coordinate axis $u$ of the spatial filter is also horizontal ($\theta = 0$) and parallel to the direction $x$ of the displacement of the picture elements, the intensity in the transform plane at the spatial filter is given by:

$$I(u,v) = 4 b^2 [\cos(\pi u d/\lambda z)]^2 I_1(u,v) \quad (4)$$

where $I_1(u,v)$ is the intensity that would be present in the transform plane $P_2$ if the input consisted of a single exposure of the undisplaced object, $u$ and $v$ are as earlier defined, and $b$ is a constant dependent upon the photographic film used to record the images. the picture )]

The intensity distribution in the double exposure is then proportional to the product of the intensity that would be produced by either input image alone multiplied by a cosine squared factor. The cosine squared factor modulates this intensity pattern to produce a set of equispaced, straight line interference fringes which are perpendicular to the $u$ axis of the spatial filter. Since the $u$ axis was chosen to be parallel to the direction of object displacement, the fringes are perpendicular to the direction of object displacement. FIG. 3b illustrates a plot of the intensity along the $u$ axis for such a double exposure also assuming laser speckle illumination of the object. A very similar curve will be produced if an object having substantial high frequency detail is photographed.

If the $u$ axis of the spatial filter is rotated an angle $\theta$ with respect to the horizontal, and the displacement $d$ in the transparency is horizontal ($x$ direction), then the quantity $d$ in expression (4) should be replaced by its projection on the $u$ axis of the spatial filter $$d \cos \theta$$

Substituting this quantity for the quantity $d$ in expression (4), it can be shown that the nulls in the fringe pattern will be located along a radius ($r$) making the angle $\theta$ to the horizontal, at values of $r_\theta$ being given by:

$$r_\theta = (n + 1/2) \lambda Z/d \cos \theta \quad (5)$$

where $n = 0, 1, 2, 3 \ldots$, and the maxima of the pattern occur at $$r_\theta = n \lambda Z/d \cos \theta \quad (6)$$

where $n = 0, 1, 2, 3 \ldots$.

Assuming the spatial filter to be horizontally aligned with the angle $\theta$ zero, the cosine $\theta$ becomes one, and expression (6) becomes:

$$r_\theta = n \lambda z/d \quad (7)$$

Now, if the viewing aperture is placed at a null in the transfer plane, the output plane will be dark all over. Conversely, if the aperture is placed at a peak of the cosine squared factor, the output plane will be bright all over. The slots 37, 38 and the lens 35 thus spatially filter the image of the input plane. For greater contrast, the width of the aperture of each slot should be small compared to the width of a cycle of the fringe spacing in the transform plane or $$\text{aperture width} \ll \lambda z/d \quad (8)$$

The foregoing mathematical discussion assumes that all parts of the object's surface are laterally displaced the same amount. If, however, different surface regions are shifted by different amounts as in the case of a compression, expansion or rotation of the surface, the image will no longer be uniformly dark but will have dark and light regions. More particularly, if the viewing aperture is placed at some fixed radial distance $r_\theta$, dark fringes will occur over the image for the displacements of $$d_n \cos \theta = n \lambda z/r_\theta \quad (9)$$

where $n = 0, 1, 2, 3 \ldots$, where the quantity $d_n \cos \theta$ is the component of the displacement in the $\theta$ direction.

The spatical filter 34 of the viewer uses the two slots 37, 38 arranged in the Fourier transform plane to produce the variable density fringes. The two slots are arranged symmetrically on opposite sides of the viewer axis and are so disposed as to select Fourier terms of the same spatial frequencies. A single slot which is simple and convenient, may also be used. The double slot gives shorter exposures if one is recording the fringes and slightly better resolution. In the present two slot viewer, the effect of two slots 37, 38 is analogous to the detection of the amplitude modulation on a radio frequency signal having the customary double sidebands. Detection in the radio receiver, resulting in the recovery of the original amplitude modulation is based on simultaneous reception of both sidebands. In the present viewer, simultaneous reception of both positive and negative spatial frequency terms reproduces the density modulation at which these spatial frequencies were recorded on the transparency in the input plane.

In summary, the variable density fringes indicate the nature of the surface motion. Depending on the circumstances, the number of fringes that are distinguishable may be on the order of a hundred although a lesser number may be on view at any one time. In regions that are being displaced a large amount, the fringes will be narrow and closely spaced. In regions of small displacement, the fringes will be wide and spaced further apart. The fringes also indicate the direction of the principal components of surface motion. Thus, if one rotates the slots of the viewer to a position in which the fringes are most closely spaced, one can establish the direction of the principal vector of surface motion. Since each continuous fringe represents a contour of constant displacement in the $\theta$ direction, and since adjacent fringes correspond to a displacement interval ($\Delta d$):

$$\Delta d = \lambda z/r_\theta \quad (10)$$

one may readily calculate the amount and direction of the displacement. Furthermore, the range of sensitivity to surface displacement may be readily increased by widening the separation $r_\theta$ of the slots in the viewer and decreased by reducing their separation.

The viewer may take one of several forms, all sharing common optical principles. Two exemplary variations using a double slot spatial filter are illustrated schematically in FIGS. 4a and 4b. FIG. 4a is a schematic illustration of the viewer configuration of FIG. 2, with like reference numerals assigned to the elements as were assigned in FIG. 2. As previously noted, the lens 32 functions jointly as a condenser lens and as the processing lens for producing the Fourier transform. The object plane 33 is placed in close proximity to the lens 32 and the spatial filter 34 is placed at the point where the image of the source 30 is brought to a sharp focus. The lens 32 thus forms the Fourier transform in this plane, while the slots in the spatial filter perform the filtering selection function. The lens 35, which forms the image from the spatially filtered transform, images the object plane 39 upon the image plane 36. The disposition of FIG. 4a produces a Fourier transform which approaches the ideal as Z approaches the focal length of lens 32. Lens selections permit a wide choice of spacings, while satisfying the foregoing constraints.

The configuration of FIG. 4b produces a more nearly ideal Fourier transform at the cost of an additional lens element. The laser source is shown at 30 together with the first short focal length lens 31. The lens 32', however, is now used only to collimate the light for illumination of the object 39. The processing lens is shown at 32'' where it is used to form the transform of the illuminated object 33 for filtering by the spatial filter 34. The output lens at 35' images the spatially filtered transform on the output plane 36. The position of the lenses along the optical axis are preferably chosen to maintain both phase and amplitude accuracy. This is normally brought about by selecting high quality lens elements 32', 32'' and 35 by distributing them along the optical axis at the focal spacings illustrated in FIG. 4b. If precise phase accuracy is not required, then the spacing between lens elements 32' and 32'', and the distance between the output lens 35 and the image plane 36 may be varied for convenience.

It should now be appreciated that very tiny lateral offsets of a laser illuminated object will produce distinct fringes in the viewer. The spacing of these fringes is a measure of the displacement. If the fringes are not distinct, measurement is of course precluded. An analysis of the light from the object under laser illumination shows that this kind of illumination contains a maximum amount of light of high spatial frequency. Since laser illumination contains this maximum, it is normally preferable when small surface displacements are to be measured. Since image detail can also be introduced by surface treatment of the object, quite good surface motion resolution is also achievable without using a coherent light source to illuminate the object.

In both modes of illumination, image detail is required comparable to the fineness of the displacement to be observed. Stated another way, the transparency must have sufficient high frequency content so that appreciable light is available at the slots of the spatial filter at the wide spacings (r large) required for high resolution.

Laser speckle illumination permits one to sense small displacements approaching the actual wavelength of the light employed. Dependent upon the parameters of the lens system, speckle illumination may also be used for coarse reading up to a few millimeters of displacement. The speckles in the image will thus be displaced in the two images but must not be displaced to the point where a different distribution of speckles in the image is produced.

If one wishes to use the fine grain detail in a surface to generate high frequency detail similar to that in the speckle pattern, one may form a sanded or pebbled surface over the object. The latter technique is effective for generally coarser measurements.

As so far described, very tiny lateral offsets of surface elements of the object may be captured on a doubly exposed transparency and thereupon rendered visible in a spatially filtered laser viewer. While spatially filtering a laser illuminated transparency can be used to show motion or distortion, it is also useful in depth contouring. For contour indication, the viewpoint between the observer and the object is normally shifted as a whole. If one uses the FIG. 1 apparatus, one uses the camera $x$ displacement screw 27 to displace the object in the camera field. Intuitively, one recognizes that the near elements in the object will appear to be offset most as the observing viewpoint shifts, while the far elements will appear to be offset least. This principle may be used to produce visible depth $z$ contours over the object surface.

Returning to a consideration of FIG. 1, let us visualize an experimental procedure by way of explanation of visible depth contour formation. Let us first take an exposure of the front face of the tuning fork. Then let us translate the camera 11 a small amount in the X direction and take a second exposure. As previously indicated, a change will now occur in the doubly exposed image viewed in the viewer. The surface of the tuning fork will be dark or bright or of intermediate brightness as a whole depending on whether the lateral displacement between exposures produces a null or a maximum or an intermediate value in expression (4). Assuming that no rotation of the tuning fork has taken place about the vertical Y axis, and that the X displacement of the camera remains relatively small, a succession of uniformly lighted images will be produced in successive X positions. If the tuning fork is rotated a small amount about the Y axis of FIG. 1 so that the face thereof is no longer orthogonal to the direction of observation (the leftmost tine 41 being arbitrarily assumed to be closer to the camera than the rightmost tine 42), X translations of the camera will no longer produce a uniformly bright image. Thus, at some minimum Y axis rotation and some minimum of camera translation, the image will begin to develop a non-uniformity of brightness and will gradually shade laterally from a light to a dark region (or vice versa) as one traverses the image surface along the X direction.

Creating surface detail in an object by plane wavefront laser illumination as in FIG. 1 is of limited application for contouring, since displacement of the lenses into a new position not occupied by it previously will place it in a new field of illumination where correlation between the two speckle images is destroyed, and fringing will be prevented. This limitation may be overcome by introducing a translucent ground glass screen 28 between the object and the source of coherent illumination. The irregularities in the screen scatter the laser illumination more generally over the surface of the object being illuminated and creates a mottling on the object visible over a much wider than the lens aperture. The effect is much the same as if one had painted spots on the object. Thus, when the lens is displaced a more substantial distance in respect to the object under this type of illumination, it may be expected to capture some of the same laser projected image detail. When this detail is available in both exposures, the stereo displacement of individual picture elements will be detectable, and contours formed in the viewer. (Of course, one may also use an object having adequate surface detail and avoid the need for coherent surface illumination.)

Continuing with the visualization, if either the Y rotation of the object or X translation of the camera is increased to somewhat larger values than those previously attempted, a new point will be reached where a plurality of vertical fringes will occur over the image surface. Each fringe will represent points of equal depth Z measured along the direction of observation. It can be shown that the fringe interval will be an approximately linear function of the depth Z of the object, when the distance to the camera is large in comparison to the depth of the object. Under such conditions, the fringes approximate equally spaced contours. It can also be shown that by increasing the distance between slits and reducing the aperture, that the number of contour lines that will be present will increase, although the brightness of each contour line may be expected to diminish as the number of lines is increased.

In contour formation, separate exposures are normally taken and the individual picture elements are carefully registered during the contouring procedure. Let us assume that the object is the tuning fork 12 in FIG. 1, rotated about the Y axis as earlier described. The normal procedure is to take first and second exposures of the object upon separate sheets of film. Then a third film is exposed with some point of the image on the two films, for instance, the near leftmost edge of the object 12, being superimposed precisely upon the leftmost edge of the object 12. From the composite film, formed by superposition of the first two, distinct fringes will be formed in the output in the vicinity of the edges which have been brought into superposition. The fringes will continue into the depth dimension for more remote object surfaces normally mapping the object completely. These contour fringes do not appear merely at one point at a time, but rather occur simultaneously over the entire image.

If one assumes that the object 12 has been rotated so that the front surface varies for an arbitrary depth of one-half inch, fringes may be set to occur at 1/16-inch intervals after a suitable X translation of the camera between exposures. If greater viewer sensitivity is desired for a given camera translation, the separation of the viewer slots may be increased and if lesser viewer sensitivity is desired, the slot separation may be reduced. The upper limits of viewer sensitivity are set in part by the amount of high frequency detail in the picture. Thus, the "adequacy" of high frequency content in the picture depends on the depth of resolution sought. Also, the greater the initial camera translation, the greater the fineness of the contour interval that can be produced.

In the foregoing example of contouring, translation of the camera is assumed while the object is held stationary between two film exposures. Also, one may use two cameras side by side and take exposures from two viewpoints simultaneously. Since motion is relative, one may normally translate the object between exposures when ordinary (non-laser) illumination is used and allow the camera to be stationary. With laser illumination using ground glass, one should normally translate both the laser and the object in unison. In each method, an ability to sense depth with precision is dependent upon the existence of substantial "virtual" fine grain detail in the object. In other words, the image of the object must have appreciable spatial frequency content at the slots of the spatial filter. If the slots are widely spaced for depth resolution sensitivity, appreciable high frequency content must be found at these positions. The above method may be applied to a number of practical examples, including depth contouring of both small and large objects, as well as for contouring mapping of terrain by an overflying aircraft.

A more precise and less intuitive analysis of the depth effect will now be undertaken with reference to FIGS. 4b, 5 and 6.

FIG. 5 schematically illustrates the pertinent geometry for determining the relative X displacement between the two image positions of a single object point 53 imaged on a pair of photographs in which the camera viewpoint is displaced laterally. One may view the situation as one in which a single camera assumes two positions or one in which two stationary stereo cameras 51, 52 are employed.

The optic axes of the lenses in the two viewing positions are assumed to remain parallel to the Z axis and to be separated a distance D measured along the X axis. An arbitrary reference plane is constructed which is normal to the optic axis and much closer to the object than to the camera lenses 51, 52. Normally, it is placed near the object near the center of the region of interest. The following parameters are defined in FIG. 5:

$F_C$ = focal length of camera lenses; both of which are equal $D$ = distance between optic axes in the two viewing positions $R$ = range from lens plane to the reference plane near object, normally passing through center of object $h$ = elevation of point on object above reference plane $X_o$ = distance from optic axis 2 to the object point as measured in a direction parallel to a line joining the two optic axes and normal to each of them The following inequalities are assumed $h \ll R$ $F_C \ll R$ At customary ranges, one assumes the image to be essentially in the focal plane of the lens, which is parallel to the reference plane. The distance ($X_{FP1}$, $X_{FP2}$) between each image point and the corresponding optic axis is then determined from similar triangles. Behind lens 51 the displacement ($X\ FP1$) is:

$$X_{FP1} = (F_C/R-h)\ X_o \qquad (11)$$

while behind lens 52 it is:

$$X_{FP2} = (F_C/R-h)\ (X_o + D) \qquad (12)$$

If the two photographed images are superimposed so that their optic axis points coincide and their X displacements remain parallel, there will be a separation in the X displacement between the two image points.

This is the parallax $p$. It is determined by taking the difference between the two quantities $X_{FP1}$ and $X_{FP2}$.

$$P = [(F_C/R-h)(X_0 + D)] - [(F_C/R-h) X_0] \quad (13)$$

which simplifies to $$P = F_C D/R - h = F_C D/R(1 - h/R) \approx F_C D/R(1 + h/R) \quad (14)$$

The final approximation results from the camera range $R$ being large compared to the object elevation $h$. From the above equation, it is seen that all points at a height $h$ have a constant X-parallax. The physical interpretation of the parallax is that it is the shift between common points in the two images that would be obtained if the two images were overlaid such that their center lines or optic axis coincided. From equation (14), it is seen that this shift is constant for constant values of $h$. Thus, all points at the same elevation are shifted by the same amount.

The parallax difference $\Delta p$ is the difference between X-parallaxes for two (different) points imaged in the stereo-pair. From the above equation, it follows that if there are two object points at elevation $h_1$ and $h_2$ having parallax shifts $p_1$ and $p_2$, respectively, the parallax difference $\Delta p = (p_1 - p_2)$ is related to the difference in elevation $\Delta h$, ($\Delta h = h_1 - h_2$), as follows $$\Delta p \approx (F_C D/R^2) \Delta h \quad (15)$$

That is, the difference in X-parallax is directly proportional to $\Delta h$, the difference in elevation.

As in the motion contours, the spatial frequency distribution in the Fourier transform plane of a single photograph for depth contouring will be similar to the FIG. 3a plot. If two photographs taken at different translations with respect to the object are combined to produce a third transparency, it can be shown that the pattern in the transform plane is equal to the pattern in one transparency multiplied by a cosine squared factor:

$$\cos^2(\pi \Delta p u / \lambda f) \quad (16)$$

FIG. 4b is a schematic representation of the optical processing system suitable for depth contour formation. Let us consider the input plane as containing the sum of the two images which are essentially identical except for a relative shift between them of $\Delta p$ in the $x$ direction. Taking an image pair in the input plane, the complex light distribution may be represented as:

$$g(x + \Delta p/2, y) + g(x - \Delta p/2, y) \quad (17)$$

where $g(x)$ is a single unshifted image.

The complex light distribution at the front and back focal planes of a lens are Fourier transforms of each other. For the system shown in FIG. 4b, the input is Fourier transformed by lens 32″, filtered by the aperture mask 34′, and Fourier transformed by lens 35′ to yield the output at 36.

Without the aperture mask, this double Fourier transform would simply yield an inverted image in the output plane. Since the aperture is normally adjusted to be arbitrarily large in the $y$ direction (vertical) it has no effect in this direction and direct imaging occurs in the $y$ direction. The effect in the $x$ direction will now be analyzed.

The Fourier transform $G(u)$ which is the complex light distribution in the transform plane (FIG. 4b), is obtained from the input as follows:

$$G(u) = \int_{-\infty}^{\infty} \left[ g\left(x + \frac{\Delta p}{2}\right) + g\left(x - \frac{\Delta p}{2}\right) \right] \exp\left(j\frac{2\pi x u}{f_t \lambda}\right) dx \quad (18)$$

$f_t$ = focal length of transform lens
$\lambda$ = laser optical wavelength
$u$ = ordinate in transform plane parallel to $x$ The above integral leads to the following:

$$G(u) = 2 \cos\left(\frac{\pi \Delta p u}{f_t \lambda}\right) \int_{-\infty}^{\infty} g(x) \exp\left(j\frac{2\pi x u}{f_t \lambda}\right) dx \quad (19)$$

This integral is the fourier transform which would result if only one image were present in the input. The effect of the second image is to multiply this integral by the indicated cosine factor in the $u$ direction. The cosine term produces zero crossings at the spacing:

$$\Delta u = \lambda f_t / \Delta p \quad (20)$$

Now consider an aperture centered at $u = U$ and having a width which is small compared to half a cycle of the cosine factor:

$$a \ll f_t \lambda / \Delta p \quad (21)$$

where $a$ is the aperture width.

The small aperture constraint is intended to restrict the value of the cosine factor to an essentially constant value over the filter aperture interval. Under these conditions it is evident that if $\Delta p$ is such as to cause the cosine to be zero at the filter aperture, no light will be passed to the output image plane. On the other hand, these values of $\Delta p$ which cause the cosine to be unity will have their output image at full brightness. Thus, the output image is weighted as a function of the displacement $\Delta p$ between common image points. The complex light distribution $g_o(X)$ is obtained by transforming $G(u)$ over the limits of the filter aperture.

$$g_o(X) = \int_{U - \frac{a}{2}}^{U + \frac{a}{2}} 2 \cos\left(\frac{\pi \Delta p u}{f_t \lambda}\right) \int_{-\infty}^{\infty} g(x) \exp\left(j\frac{2\pi x u}{f_t \lambda}\right) dx \exp\left(j\frac{2\pi X u}{f_t \lambda}\right) du \quad (22)$$

Due to the small aperture constraint on $a$, the cosine factor can be considered constant and removed from the integral.

$$g_0(X) = 2\cos\left(\frac{\pi U \Delta p}{f_t \lambda}\right) \int_{-\infty}^{\infty} \left\{ \left[\exp\frac{j2\pi U(x+X)}{f_t \lambda}\right] \left[\frac{a\sin\left(\frac{\pi a(x+X)}{f_t \lambda}\right)}{\frac{\pi a(x+X)}{f_t \lambda}}\right] \right\} g(x)\,dx$$

(23)

The final integral is the convolution of a single image $g(x)$ with the complex spread function in the braces. This spread function approaches a delta function with width and side lobes determined by the filter aperture size $(a)$. Thus, the input image is reproduced, within the resolving limits of the filter aperture $a$. This image is multiplied by the cosine weighting factor. The nulls in this cosine weighting factor produce the desired contour lines.

The interval between contour lines is determined by the choice of $U$ — the slot interval. The cosine will go from a null to null when the shift $\Delta p$ has changed by an increment $\Delta p_o$ given as follows $$\Delta p_o = f_t \lambda / U$$

(24)

Thus, the larger that $U$ is, the smaller the displacement increment between contour lines.

In summary, if the input plane contains two identical photographic transparencies shifted from each other by an amount $\Delta p$ the diffraction pattern observed in the transform plane is just the pattern produced by either transparency alone multiplied by a cosine factor as illustrated in FIG. 3b. The spacing of the cosine fringes is given by $\Delta u = \lambda f_t / \Delta p$; $\lambda$ and $f_t$ are the wavelength of the illuminating source and focal length of the transform lens, respectively. Thus, the spacing of the fringes is inversely proportional to the shift of the h two input functions. Obviously, if one were to place his eye at a null in the transform plane and look at the input plane, the input would appear dark; conversely, if this point were a peak of the cosine factor, the input plane would appear bright. This is the purpose of the slit aperture in the transform plane and the lens 35' which forms a filtered image of the input plane. The width of the aperture must be small compared to the width of a fringe cycle as determined by $\Delta u$ given above.

When parts of the two images are shifted by different amounts, then parts of the output image will contain dark fringes and parts of it bright fringes. For a fixed observation point $u$ in the transform plane, a dark fringe will occur at any point having a shift $\Delta p$ given by:

(dark fringes) $\Delta p = \lambda f_t/U;\ 3\lambda f_t/2U;\ 5\lambda f_t/2U;\ \ldots$ (25)

and bright fringes occur for $\Delta p = 0;\ \lambda f_t/U;\ 2\lambda f_t/U;\ 2\lambda f_t/U \ldots$ (26)

Thus, for a fixed observation (or aperture position), adjacent fringes in the image represent a constant shift difference between images by the amount expressed in equation (24). Changing the aperture separation $U$, increases or decreases the fringe spacing in the image. Close fringe spacing corresponds to a larger shift between common points in the two images, while wide spacings correspond to a smaller shift.

It has been shown that if a stereo-pair of photographs are superimposed so that they coincide at some reference image point and have no relative rotation between them, then all points which were at the same elevation will have their paired image points shifted by the same amount (expression 14), and the difference in shift $\Delta p_o$ between points having a fixed elevation interval $\Delta h_o$ is given by expression (15). Thus, a fixed change in elevation corresponds to a fixed shift between paired image points when going from one elevation to the next.

When the stereo pair is placed in the optical processor, the output image will contain a system of bright and dark fringes which represent contours of constant displacement between the two images in the stereo pair. The displacement and, therefore, the fringe spacing can be directly related to differences in elevation:

$$\Delta h = \lambda f_t R^2 / U F_C D$$

(27)

Thus, the processor provides a means of displaying all elevation contour lines simultaneously and the size of the elevation increment between contour lines can be conveniently controlled by simply changing the position of the aperture in the transform plane.

While it might appear that the contour interval, $\Delta h$, can be made as small as desired by simply increasing the value of the aperture position or by decreasing $f_t$, the focal length of the transform lens, there is in fact a limit. Both of these quantities can be interrelated when they are expressed in terms of the resolution or spatial frequency content (lines/mm) in the input image. If $s_m$ is the highest spatial frequency contained in the input image, and assuming the transform lens is capable of passing this frequency, the maximum allowable value of $U$ in the transform plane is given by $$U_{max} = \lambda f_t s_m$$

(28)

That is, beyond this point in the transform plane there is no diffracted light, or only an insignificant amount. Substituting into equation (27) gives the minimum elevation contour interval, $$\Delta h_{min} = R^2/s_m F_C D$$

(29)

Thus, as one might intuitively expect, the finest contour interval attainable is a function of the resolution contained in the input image.

The resolution in the output image of the processor is determined by the size of the slit in the transform plane. As previously noted, either a single slit or a double slit may be used. In the preceding discussion it was assumed that the slit width was small enough to limit the resolution to the point where only one image is resolvable in the output plane rather than the two slightly displaced images. If the output image resolution is too low, the contour lines may be transferred from the low resolution image to the original high resolution image by first recording the contours on the low resolution image and then superimposing them onto the original high resolution image.

What I claim as new and desire to secure by Letters Patent of the United States is:

1. The method of sensing differential displacement of surface elements of an object orthogonal to the direction of observation comprising:
   a. imaging said observed object under conditions of illumination providing appreciable surface detail at spatial frequencies suitable for resolving the orthogonal surface displacements to be sensed,
   b. recording two correlatable images of said object between which surface elements of said object are displaced relative to the observer in a direction orthogonal to the direction of observation,
   c. simultaneously superimposing elements of said correlatable images without relative rotation upon a transparency,
   d. illuminating said transparency by a narrow spectral band light source, and
   e. imaging said transparency through a narrow band spatial filter positioned to form an interference pattern whose spacing and orientation indicates the magnitude and direction of differential orthogonal displacement of said surface elements.

2. The method of sensing surface distortion orthogonal to the direction of observation comprising:
   a. imaging said observed object under conditions of illumination providing appreciable surface detail at spatial frequencies suitable for resolving the orthogonal surface displacements to be sensed,
   b. recording two correlatable images of said object between which surface elements of said object are displaced by object distortion in relation to other surface elements and relative to the observer in a direction orthogonal to the direction of observation,
   c. simultaneously superimposing elements of said correlatable images without relative rotation upon a transparency,
   d. illuminating said transparency by a narrow spectral band light source, and
   e. imaging said transparency through a narrow band spatial filter positioned to form an interference pattern of equal displacement contours whose spacing and orientation indicates the magnitude and direction of surface distortion.

3. The method of claim 2 wherein said superposition corresponds to the registering of undistorted surface elements of said image.

4. The method of claim 2 wherein said transparency is illuminated by a coherent light source.

5. The method of claim 3 wherein said coherent light source is a point source.

6. The method of claim 2 wherein said spatial filter is disposed in the Fourier transform plane and has a narrow slot for selection of a narrow band of spatial frequencies, restricted to a region which is less than a cycle of the cosine factor in the Fourier transform of the double input function.

7. The method of claim 6 wherein said spatial filter is provided with a pair of symmetrically placed slots.

8. The method of claim 6 wherein said spatial filter is rotatable in relation to said transparency to permit evaluation of each orthogonal displacement component.

9. The method of claim 2 wherein said surface detail is provided by speckling laser illumination of said object.

* * * * *